(12) United States Patent
Schwery et al.

(10) Patent No.: US 8,569,923 B2
(45) Date of Patent: Oct. 29, 2013

(54) ROTATING ELECTRIC MACHINE WITH INTERLOCKING INNER AND OUTER PRESS PLATES

(75) Inventors: Alexander Schwery, Kuettigen (CH); Serdar Cifyildiz, Winterthur (CH); Hanspeter Walser, Laupersdorf (CH); Ricardo Okai, Fislisbach (CH)

(73) Assignee: Alstom Renewable Technologies, Grenoble (FR)

( * ) Notice: Subject to any disclaimer, the term of this patent is extended or adjusted under 35 U.S.C. 154(b) by 51 days.

(21) Appl. No.: 13/275,416

(22) Filed: Oct. 18, 2011

(65) Prior Publication Data

US 2012/0104896 A1    May 3, 2012

Related U.S. Application Data

(63) Continuation of application No. PCT/EP2010/055055, filed on Apr. 16, 2010.

(30) Foreign Application Priority Data

Apr. 24, 2009  (DE) ........................ 10 2009 018 549
Aug. 20, 2009  (DE) ........................ 10 2009 037 987

(51) Int. Cl.
*H02K 1/06* (2006.01)
(52) U.S. Cl.
USPC ...... 310/216.007; 310/216.004; 310/216.008; 310/216.015
(58) Field of Classification Search
USPC ..................... 310/216.004, 216.007–216.009, 310/216.011, 216.016, 216.013, 216.015, 310/216.021, 216.022, 216.049, 216.061, 310/216.084–216.086
See application file for complete search history.

(56) References Cited

U.S. PATENT DOCUMENTS

| 725,773 A | 4/1903 | Reist |
| 2,519,219 A | 8/1950 | Baudry et al. |
| (Continued) | | |

FOREIGN PATENT DOCUMENTS

| DE | 701612 C | 1/1941 |
| DE | 1090749 B | 10/1960 |
| (Continued) | | |

OTHER PUBLICATIONS

European Patent Office, International Search Report in International Patent Application No. PCT/EP2010/055055 (Jul. 20, 2010).

(Continued)

*Primary Examiner* — Tran Nguyen
*Assistant Examiner* — Jose Gonzalez Quinones
(74) *Attorney, Agent, or Firm* — Leydig, Voit & Mayer, Ltd.

(57) ABSTRACT

A rotating electric machine includes a rotor configured to rotate about an axis. The rotor includes a rotor laminate stack having layered laminations pressed in an axial direction to form a composite, the rotor laminate stack being radially divided into an inner mechanical region and an outer electrical region. A rotor winding is disposed in the electrical region of the rotor laminate stack. A stator concentrically surrounds the rotor. A press plate is configured to press the layered laminations in the axial direction, the press plate being radially divided into a separate inner press plate and a separate outer press plate so as to correspond to the radial division of the rotor laminate stack.

10 Claims, 2 Drawing Sheets

(56) References Cited

U.S. PATENT DOCUMENTS

| | | | |
|---|---|---|---|
| 3,123,729 A | | 3/1964 | Fagel |
| 3,335,308 A | | 8/1967 | Robinson |
| 4,489,249 A | * | 12/1984 | Olivier ................ 310/216.011 |
| 4,942,324 A | * | 7/1990 | Ooyama et al. ........ 310/216.007 |
| 5,068,564 A | | 11/1991 | Frank |
| 5,473,213 A | | 12/1995 | Kahle, Sr. |
| 5,635,785 A | | 6/1997 | Schwanda et al. |
| 5,816,761 A | | 10/1998 | Cassatt et al. |
| 6,157,109 A | | 12/2000 | Schiferl et al. |
| 6,789,993 B2 | | 9/2004 | Ozawa et al. |

FOREIGN PATENT DOCUMENTS

| | | | |
|---|---|---|---|
| DE | 1124592 B | | 3/1962 |
| DE | 1141020 B | | 12/1962 |
| DE | 1161637 B | | 1/1964 |
| DE | 1178143 B | | 9/1964 |
| DE | 1184411 B | | 12/1964 |
| DE | 1196779 B | | 7/1965 |
| DE | 1563007 A1 | | 4/1970 |
| DE | 3907860 A1 | | 12/1989 |
| DE | 19513457 A1 | | 10/1996 |
| DE | 102008016890 A1 | | 4/2009 |
| DE | 102007000668 A1 | | 5/2009 |
| EP | 0414129 A2 | | 2/1991 |
| EP | 414129 A2 | * | 2/1991 |
| GB | 981727 B | | 1/1965 |
| JP | 57138830 A | | 8/1982 |
| JP | 60035931 A | | 2/1985 |
| JP | 61058439 A | | 3/1986 |
| JP | 11-266555 | | 9/1999 |
| WO | 8001444 A1 | | 7/1980 |

OTHER PUBLICATIONS

European Patent Office, International Search Report in International Patent Application No. PCT/EP2010/055153 (Jul. 26, 2010).
German Search Report for DE 10 2009 037 987.8, dated Aug. 20, 2009.

* cited by examiner

ROTATING ELECTRIC MACHINE WITH INTERLOCKING INNER AND OUTER PRESS PLATES

CROSS REFERENCE TO PRIOR APPLICATIONS

This application is a continuation of International Patent Application No. PCT/EP2010/055055, filed on Apr. 16, 2010, which claims priority to German Patent Application Nos. 10 2009 018 549.6, filed Apr. 24, 2009, and 10 2009 037 987.8, filed Aug. 20, 2009. The entire disclosure of the applications is incorporated by reference herein.

FIELD

The present invention relates to the field of electrical energy generation. It relates to a rotating electric machine.

BACKGROUND

Double-fed asynchronous machines in the performance range of from 20 MVA to 500 MVA or above can be used for energy production with variable rotation speed. These machines are characterized by a distributed three-phase winding on the rotor. The rotor winding comprises individual bars, which are embedded in slots in the rotor laminate stack. The individual bars are interconnected to form a winding in the end winding. The currents are fed via at least three sliprings, which are fastened to the shaft at the end of the machine. A detail of such a machine is shown in FIG. 1 in very simplified form. The asynchronous machine 10 illustrated in FIG. 1 has a machine axis 13. A central body 11 with a shaft on which the sliprings 12 are arranged is capable of rotating about this axis 13. The rotor laminate stack 14 is arranged around the central body 11, and an auxiliary rim 20 adjoins the rotor laminate stack beneath an end winding 16 of the rotor winding. The rotor laminate stack 14 is surrounded concentrically by a stator laminate stack 15, in which a stator winding is accommodated which protrudes outwards with a stator end winding 17 at the end of the stack. The rotor laminate stack 14 is illustrated in enlarged form in detail in FIG. 2.

Since the rotors of double-fed asynchronous machines bear a rotor winding 18, said rotor winding needs to be protected from the centrifugal forces occurring. The rotor laminate stack serves firstly to absorb these forces and at the same time defines the path of the magnetic flux. The auxiliary rim 20 serves to absorb the centrifugal forces which act on the rotor end winding 16. The auxiliary rim 20, as well as the rotor laminate stack 14, consist of layered laminations, which are pressed in the axial direction to form a composite. It is known to use in this case a press plate 19, which distributes the pressure power applied by bolts 21, 22 between the laminations of the rotor laminate stack (see, for example, DE-A1-195 13 457 or DE-A1-10 2007 000 668).

Various demands are placed on the rotor laminate stack 14. FIG. 2 illustrates the basic division into an electrical region 14a and a mechanical region 14b. Firstly, the intention is for sufficient axial pressure to be provided between the layers of the laminations in the teeth for guaranteeing the homogeneity of the stack. In order to avoid vibrations, the layers should not work loose since relative movements between the teeth and the rotor winding 18 could damage the insulation. Secondly, the pressure should not be too great in order to avoid damage to the insulation layers between the individual laminations since such damage would result in increased losses. The axial pressure is intended to be higher in the mechanical region 14b of the rim than in the electrical region 14a in order to obtain a certain frictional force between the laminations.

SUMMARY OF THE INVENTION

In an embodiment, the present invention provides a rotating electric machine. A rotor is configured to rotate about an axis and includes a rotor laminate stack having layered laminations pressed in an axial direction to form a composite, the rotor laminate stack being radially divided into an inner mechanical region and an outer electrical region. A rotor winding is disposed in the electrical region of the rotor laminate stack. A stator concentrically surrounds the rotor. A press plate is configured to press the layered laminations in the axial direction, the press plate being radially divided into a separate inner press plate and a separate outer press plate so as to correspond to the radial division of the rotor laminate stack.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the invention relates to a double-fed asynchronous machine in a performance range between 20 MVA and 500 MVA or more.

In an embodiment, an aspect of the invention is to improve an electric machine of the type mentioned at the outset in such a way that the different demands placed on the bracing of the rotor laminate stack in the different regions can be met considerably better.

In an embodiment of the invention, the press plate is divided radially into a separate inner press plate and a separate outer press plate corresponding to the radial division of the rotor laminate stack. By virtue of the press plate being separated corresponding to the different regions of the rotor laminate stack, the forces acting on the rotor laminate stack can be optimized separately.

A first configuration of the invention is characterized by the fact that the inner and outer press plates are connected detachably to one another. As a result, the centrifugal forces acting on the outer press plate can be absorbed effectively.

Another configuration is characterized by the fact that the inner and outer press plates adjoin one another and are connected to one another in such a way that the outer press plate can be tipped with respect to the inner press plate.

In an embodiment, it is particularly advantageous if the outer press plate is divided along the circumference into individual identical circumferential parts, in that the circumferential parts of the outer press plate adjoin, in each case with a straight tipping edge, the inner press plate, and if the circumferential parts of the outer press plate are each suspended in the inner press plate.

Preferably, the circumferential parts of the outer press plate can be each suspended in the inner press plate by means of hammer claws.

A further configuration of the invention is characterized by the fact that the inner press plate has first holes, through which first bolts pass for pressing the rotor laminate stack in the mechanical region, and the fact that the outer press plate has second holes, through which second bolts pass for pressing the rotor laminate stack in the electrical region.

It is advantageous here if the first bolts are in the form of shearing bolts and the second bolts are in the form of tie bolts.

In an embodiment, sufficient axial pressure is provided between the layers of the laminations in the teeth for guaranteeing the homogeneity of the stack. In order to avoid vibrations, the layers should not work loose since relative movements between the teeth and the rotor winding could damage the insulation. Secondly, the pressure should not be too great in order to avoid damage to the insulation layers between the individual laminations since such damage would result in increased losses. The intention is for the axial pressure to be higher in the mechanical region of the rim than in the electrical part in order to obtain a certain friction force between the laminations.

Figure 1:
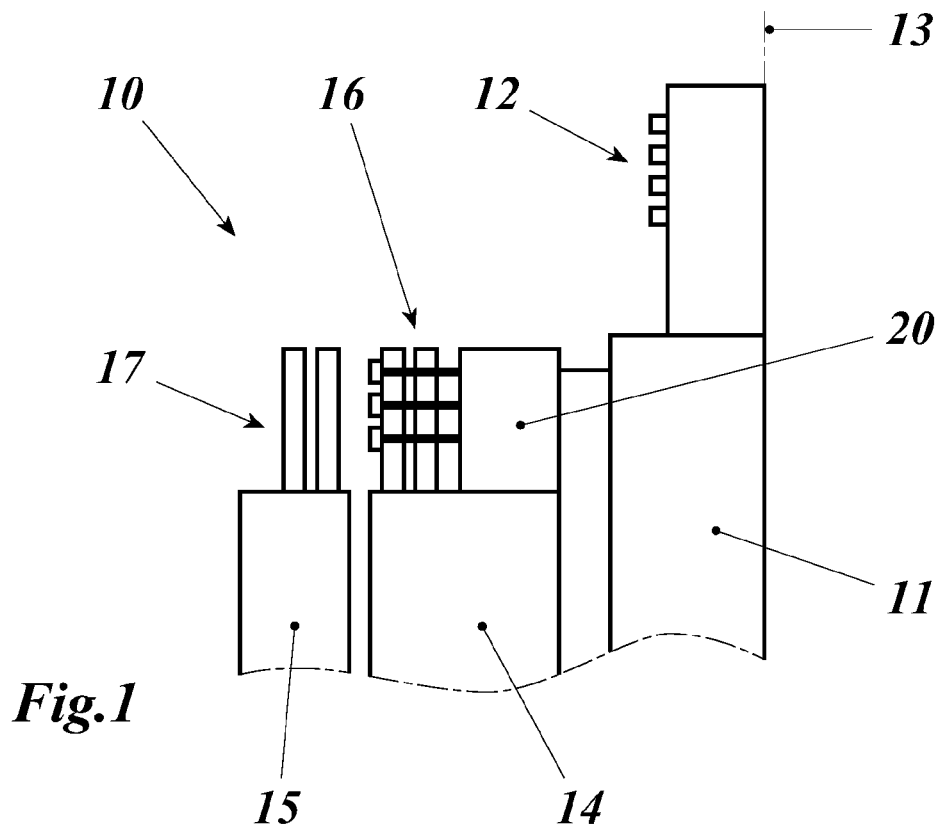
FIG. 1 shows a simplified illustration of a detail of an asynchronous machine.
Figure 2:
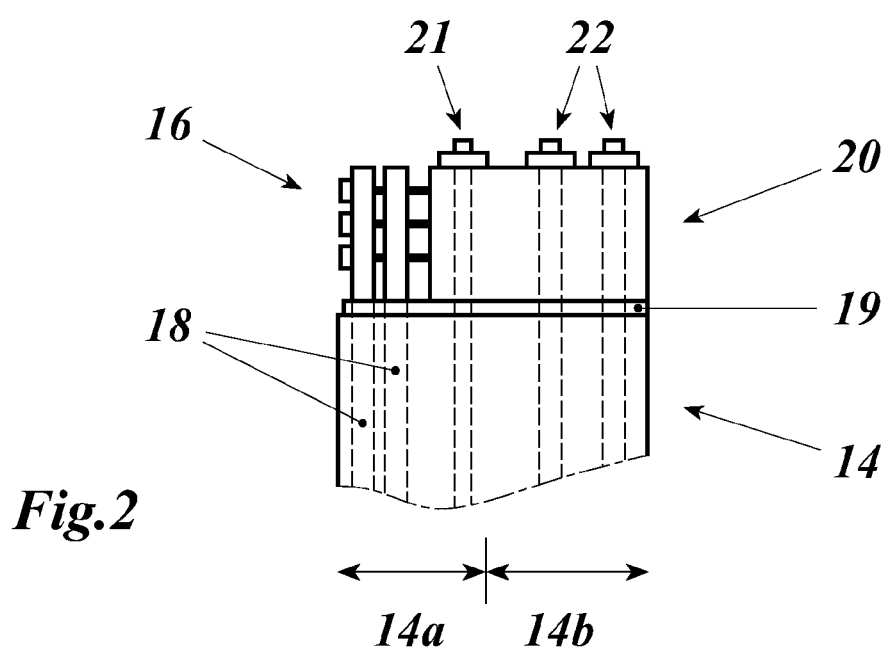
FIG. 2 shows an enlarged detail of the design of the rotor laminate stack of the machine shown in FIG. 1 including a press plate used for bracing the rotor laminate stack.
Figure 3:
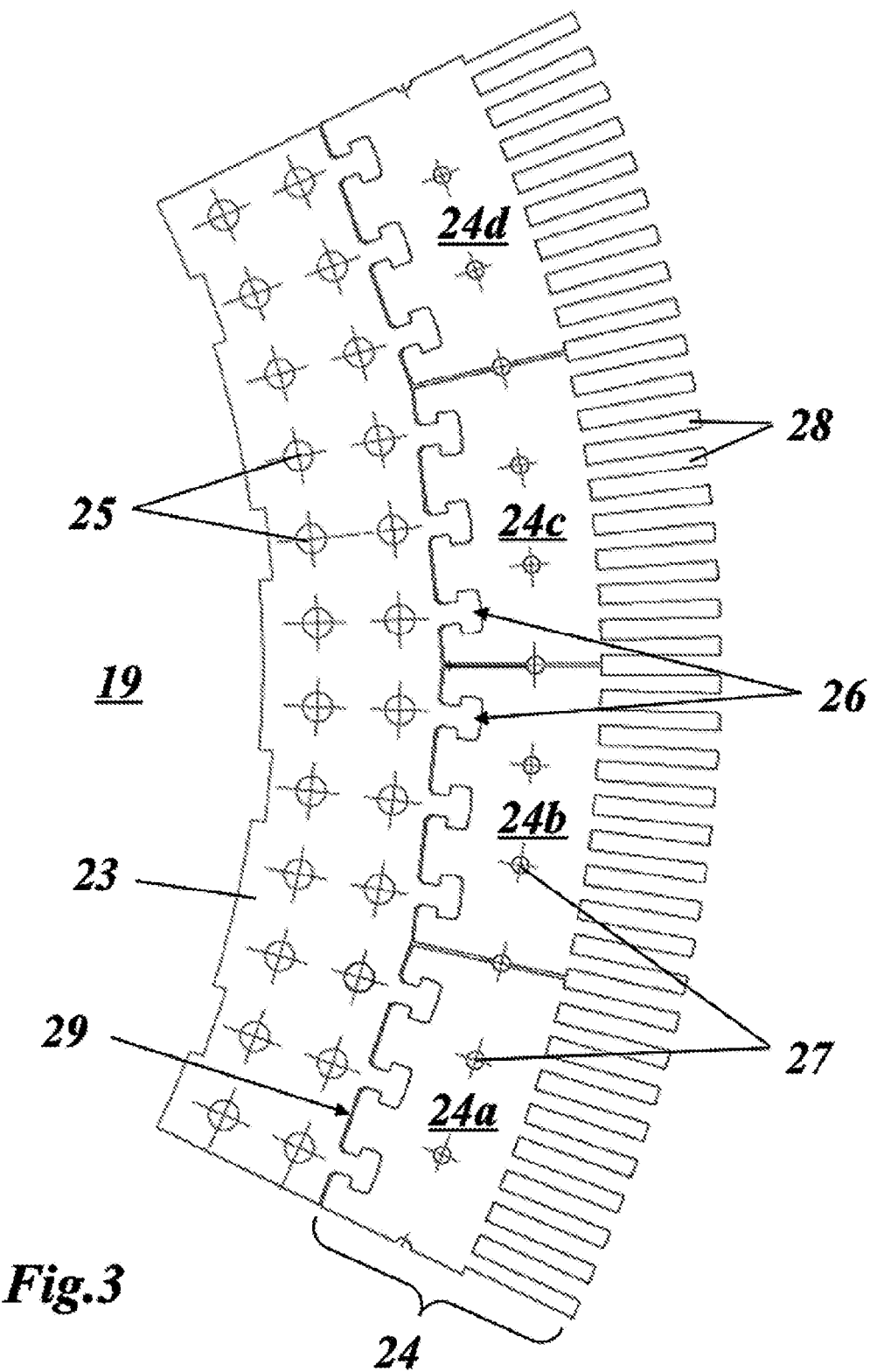
FIG. 3 shows a plan view in the axial direction of a sector of a press plate for bracing the rotor laminate stack in accordance with an exemplary embodiment of the invention.

These contradictory demands placed on the electrical and mechanical part of the stator laminate stack 14 can be achieved by a radially separated press plate 19. FIG. 3 shows a schematic illustration of an exemplary embodiment of the press plate 19 in a plan view in the axial direction. The press plate 19 is divided both in the radial direction and partially in the circumferential direction into a separate inner press plate 23 and a separate outer press plate 24.

The inner press plate 23 can both have a solid design and, in accordance with a supplementary type of embodiment, comprise a plurality of thin laminations. It has proven to be particularly advantageous here to arrange the thin laminations individually or in groups in a manner offset with respect to one another in the circumferential direction. Such layering of the inner press plate 23 forms a self-supporting ring, whereby the forces on the shearing bolts can be considerably reduced.

The outer press plate 24 for its part is divided in the circumferential direction into individual circumferential parts 24*a-d*, which preferably consist of nonmagnetic steel. By virtue of the division of the press plate 19 into an inner and a plurality of outer parts 23 and 24*a-d*, respectively, in a manner which follows the division of the rotor laminate stack 14 into a mechanical region 14*b* and an electrical region 14*a*, the nature of the axial bracing can be optimized separately for the different regions of the rotor laminate stack.

In order to be able to achieve targeted tipping of the outer press plate 24, the separation between the outer and inner press plate 23 and 24, respectively, needs to have a straight tipping edge 29. By virtue of the radial separation of the press plate 19, it is possible to achieve different pressures in the electrical and mechanical regions 14*a* and 14*b*, respectively, of the rotor laminate stack 14. In order to protect the outer press plate 24 from centrifugal forces, it is suspended in the inner press plate 23 via hammer claws 26 as shown in FIG. 3.

In order to build up the desired axial pressure in the rotor laminate stack 14, shearing and tie bolts 22 and 21, respectively, are used. The tie bolts 21 pass through the holes 27 in the press plate 19 over the entire axial length of the rotor laminate stack 14. Since the tie bolts 21 are located in the magnetically active part (high magnetic induction) of the laminate stack, they need to be electrically insulated. In order to avoid mechanical loading of the insulation, these bolts cannot be subject to shear, however. Owing to the stress in the bolt, the pressure on the outer press plate 24 and therefore the pressure in the teeth can be "adjusted".

Instead of tie bolts 21 which pass through, studs can also be used in the auxiliary rim 20, however. If a stud is used in the auxiliary rim 20, the pressure is transferred to the tooth region of the rotor laminate stack 14. A pressure plate and a nut are located between the studs and the press plate 19. The screw-in depth of the bolt in the nut can be used to "adjust" the pressure on the press plate 19 and therefore on the teeth.

The shearing bolts 22 perform two tasks. They are firstly used for applying the axial pressure in the mechanical region 14*b* of the rotor laminate stack 14. Secondly, they need to absorb the shear forces occurring between the laminations. For this reason, the bolts cannot be insulated and are therefore located on the inner periphery, in the magnetically little used part of the rotor laminate stack 14.

While the invention has been described with reference to particular embodiments thereof, it will be understood by those having ordinary skill the art that various changes may be made therein without departing from the scope and spirit of the invention. Further, the present invention is not limited to the embodiments described herein; reference should be had to the appended claims.

LIST OF REFERENCE SYMBOLS

10 Asynchronous machine
11 Central body (with shaft)
12 Slipring
13 Axis
14 Rotor laminate stack
14*a* Electrical region
14*b* Mechanical region
15 Stator laminate stack
16 Rotor end winding
17 Stator end winding
18 Rotor winding
19 Press plate
20 Auxiliary rim
21 Tie bolt
22 Shearing bolt
23 Inner press plate
24 Outer press plate
24*a-d* Circumferential part
25,27 Hole
26 Hammer claw
28 Tooth
29 Tipping edge

The invention claimed is:

1. A rotating electric machine, comprising:
a rotor configured to rotate about an axis and including a rotor laminate stack having layered laminations pressed in an axial direction to form a composite, the rotor laminate stack being radially divided into an inner mechanical region and an outer electrical region;
a rotor winding disposed in the electrical region of the rotor laminate stack;
a stator concentrically surrounding the rotor; and
a press plate configured to press the layered laminations in the axial direction, the press plate being radially divided into a separate inner press plate and a separate outer press plate so as to correspond to the radial division of the rotor laminate stack,
wherein the inner press plate includes a T-shaped claw, wherein the outer press plate includes a socket which reciprocates the T-shaped claw, and wherein the T-shaped claw and the socket are configured to couple the inner press plate and the outer press plate.

2. The rotating electric machine as recited in claim 1, wherein the rotating electric machine is a double-fed asynchronous machine having a performance range above 20 MVA.

3. The rotating electric machine as recited in claim 1, wherein the inner and outer press plates are detachably connected to one another.

4. The rotating electric machine as recited in claim 3, wherein the inner press plate and the outer press plate are connected to one another such that the outer press plate is configured to be tipped with respect to the inner press plate.

5. The rotating electric machine as recited in claim 4, wherein the outer press plate is divided along a circumference of the press plate into a plurality of individual identical circumferential parts each being suspended in the inner press plate and including a straight tipping edge adjoining the inner press plate.

6. The rotating electric machine as recited in claim 5, wherein each of the plurality of individual identical circumferential parts are suspended in the inner press plate via a plurality of hammer claws.

7. The rotating electric machine as recited in claim 1, wherein the inner press plate includes a plurality of first holes each configured to receive a first bolt so as to press the rotor laminate stack in the mechanical region, and wherein the outer press plate includes a plurality of second holes each configured to receive a second bolt so as to press the rotor laminate stack in the electrical region.

8. The rotating electric machine as recited in claim 7, wherein the first bolts are shearing bolts and the second bolts are tie bolts.

9. The rotating electric machine as recited in claim 1, wherein the inner press plate includes a plurality of laminations.

10. The rotating electric machine as recited in claim 9, wherein the plurality of laminations of the inner press plate are disposed along a circumferential direction one of individually and in groups so as to be offset with respect to one another in the circumferential direction.

* * * * *